(12) United States Patent
Schneider

(10) Patent No.: US 8,074,333 B2
(45) Date of Patent: Dec. 13, 2011

(54) METHOD TO CONVERT A NON-ADJUSTABLE CLUTCH COVER TO AN ADJUSTABLE CLUTCH COVER

(76) Inventor: Scott A. Schneider, Evansville, IN (US)

(*) Notice: Subject to any disclaimer, the term of this patent is extended or adjusted under 35 U.S.C. 154(b) by 1085 days.

(21) Appl. No.: 11/977,065

(22) Filed: Oct. 23, 2007

(65) Prior Publication Data

US 2008/0093192 A1   Apr. 24, 2008

Related U.S. Application Data

(60) Provisional application No. 60/853,741, filed on Oct. 23, 2006.

(51) Int. Cl.
*F16D 13/64* (2006.01)

(52) U.S. Cl. .................. 29/401.1; 29/402.09; 29/402.12; 29/402.17; 29/402.06

(58) Field of Classification Search .............. 29/401.1, 29/402.09, 402.11, 402.12, 402.14, 402.15, 29/402.17, 407.04, 402.05, 402.06, 557, 29/558, 893, 893.3, 893.35; 192/70.252
See application file for complete search history.

(56) References Cited

U.S. PATENT DOCUMENTS

| | | | | |
|---|---|---|---|---|
| 4,502,198 A | * | 3/1985 | Billet | 29/402.08 |
| 6,098,773 A | * | 8/2000 | Blessinger et al. | 192/70.252 |
| 2004/0250593 A1 | * | 12/2004 | Takagi | 72/340 |

* cited by examiner

*Primary Examiner* — David Bryant
*Assistant Examiner* — Chirstopher Besler
(74) *Attorney, Agent, or Firm* — Gary K. Price

(57) ABSTRACT

A method to avoid discarding a worn non-adjusting clutch cover by converting the worn non-adjusting clutch cover to an adjusting clutch cover for re-use. First, the convex portion of the non-adjusting cover is adapted to receive an adjusting ring having the embodiments of the adjusting rings known in the art. The convex portion is cleaned by taking about 0.20-0.030 of one inch depth from an inner surface of the convex portion. A threaded wall is defined in the inner surface such that the adjusting ring having an externally threaded surface can be threadably coupled to the internally threaded surface of the inner surface of the convex portion. An adjuster aperture is drilled through the cover to receive a ring adjuster that engages the adjusting ring for positional adjustment.

9 Claims, 3 Drawing Sheets

SECTION A-A

SECTION A-A

METHOD TO CONVERT A NON-ADJUSTABLE CLUTCH COVER TO AN ADJUSTABLE CLUTCH COVER

CROSS REFERENCES TO RELATED APPLICATIONS

U.S. Provisional Application for Patent No. 60/853,741, filed Oct. 23, 2006, with title "Method to Convert a Non-Adjustable Clutch Cover to an Adjustable Clutch Cover" which is hereby incorporated by reference. Applicant claims priority pursuant to 35 U.S.C. par. 119(e)(i).

Statement as to rights to inventions made under Federally sponsored research and development: Not Applicable

BACKGROUND OF THE INVENTION

1. Field of the Invention

The present invention relates generally to clutches and, more particularly, to a method for converting a non-adjustable clutch cover to an adjustable clutch cover for re-use.

2. Brief Description of Prior Art

Clutches are designed to transfer and interrupt torque from an engine to a transmission in a vehicle or the like. Conventionally, clutches are equipped with a clutch cover assembly for pressing and releasing a clutch disc against and from a flywheel. As is known in the art, there is available what is commonly referred to as a "solo" or non-adjustable clutch cover and an adjustable clutch cover.

The non-adjustable clutch cover generally includes a pressure plate supported by the clutch cover that frictionally engages a clutch facing so as to be urged away from the clutch facing when the clutch is disengaged, and is urged toward the clutch facing by a diaphragm spring when the clutch is engaged. Characteristic of non-adjustable clutch covers is that once sufficiently worn, the clutch cover with components is simply discarded.

The adjusting clutch cover includes an adjusting ring having an externally threaded surface which is threadably coupled to an internally threaded surface of the clutch cover. By rotating the adjusting ring so as to axially advance it with respect to the clutch cover and the drive train, ends of levers that urge driving and driven discs into contact with one another are advanced so as to maintain proper pressure between the abutting surfaces of the levers and the pressure plate. A characteristic of the adjusting clutch cover is that in the event of wear, the adjusting ring is rebuilt or replaced and the clutch cover remains functional.

Therefore, it would be advantageous to have an inexpensive and efficient method to convert a non-adjustable clutch cover to be discarded, to an adjustable clutch cover for re-use.

As will be seen from the subsequent description, the preferred embodiments of the present invention overcome the above problems and difficulties of the prior art.

SUMMARY OF THE INVENTION

A method to convert a "solo" or non-adjustable clutch cover to an adjustable clutch cover is disclosed. A typical non-adjusting clutch cover includes a first side and a second side, a wear indicator slot and a convex portion disposed on the second side. To convert, the convex portion of the cover is first adapted to receive an adjusting ring having the embodiments of the adjusting ring known in the art. The convex portion is first cleaned and a threaded wall is defined in an inner surface of the convex portion such that the adjusting ring having an externally threaded surface can be threadably coupled to the internally threaded surface of the inner surface of the convex portion. An adjuster aperture is drilled through the cover and mill flats are disposed adjacent the adjuster aperture. The adjuster aperture is sized so that a ring adjuster can be positioned through the clutch cover as is characteristic with adjustable clutch covers. In application, the ring adjuster passes through the adjuster aperture so that a worm wheel of the ring adjuster is in communication with the adjusting ring as is known in the art. In particular, the mating with a worm threaded part of the worm wheel is formed on an inner peripheral surface of the adjusting ring so that the adjusting ring is rotated for movement in its positional adjustment when the worm wheel rotates.

DESCRIPTION OF THE PREFERRED EMBODIMENT

Figure 1:
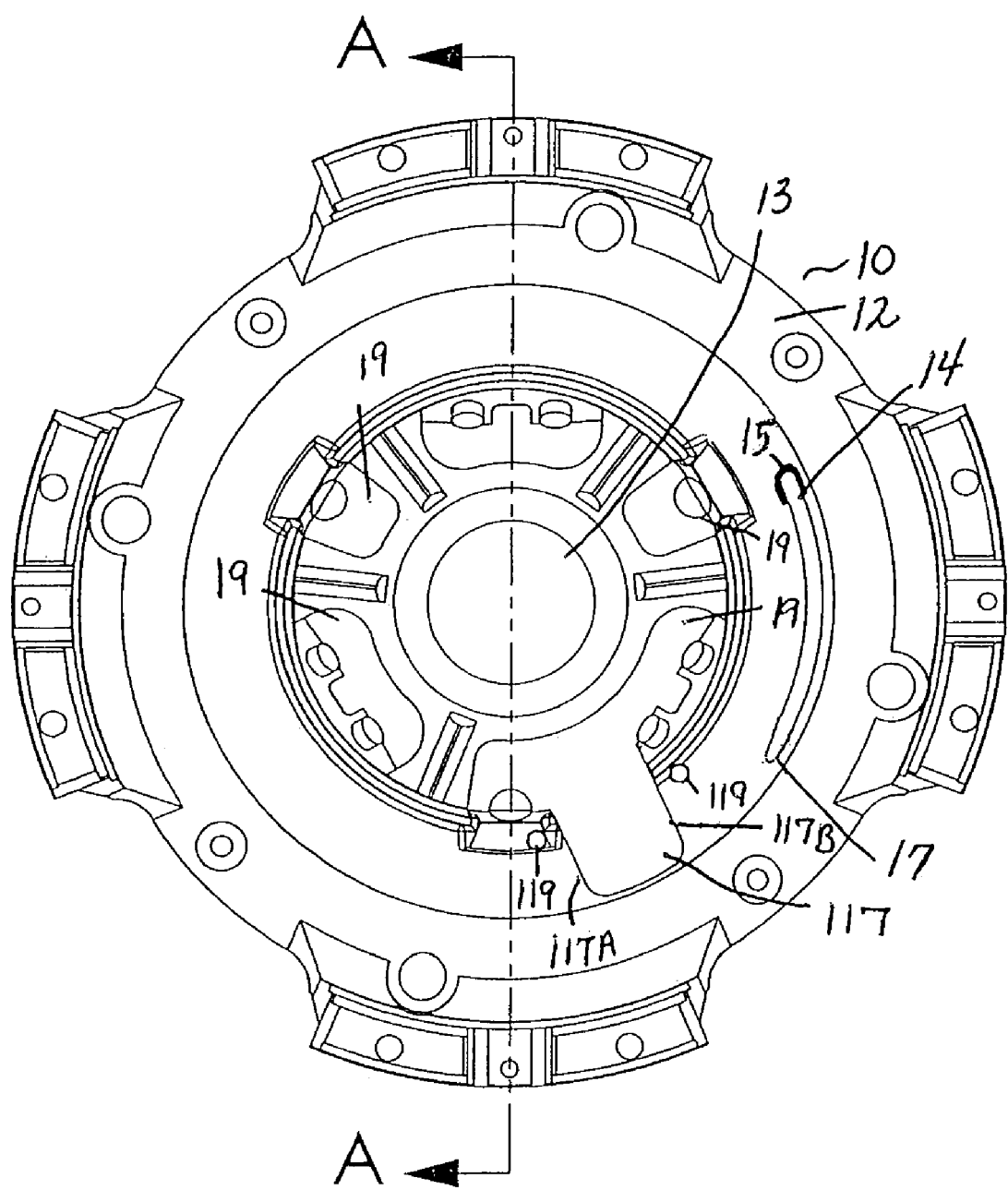
FIG. 1 is a top view of a first side of a clutch cover in accordance with the present invention.

In accordance with the present invention, a method for converting a non-adjusting clutch cover to an adjusting clutch cover is disclosed. Specifically, the present method is directed to a means to avoid discarding a worn non-adjusting clutch cover by incorporating embodiments of an adjusting clutch cover for re-use. In the broadest context, the method of the present invention consists of components configured and correlated with respect to each other so as to attain the desired objective.

A non-adjusting clutch cover 10 includes a first side 12 that has a circular central opening 13 having a plurality of stepped projections, a wear indicator slot 14 that defines a U-shaped end 15 and opposite end 17, and a plurality of openings 19 for accommodating biasing springs (not shown) which are known in the art.

Figure 2:
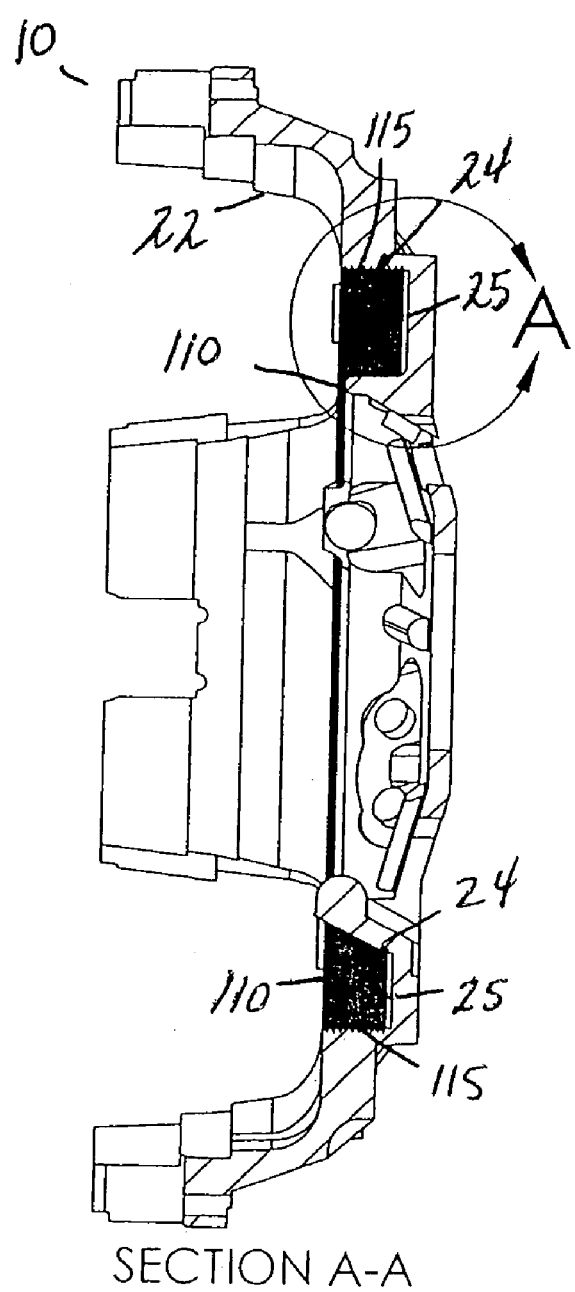
FIG. 2 is a cross-sectional view depicting an adjusting ring coupled to an internally threaded surface of the clutch cover of FIG. 1.

FIG. 2 illustrates the inner periphery or second side 22 of the clutch cover 10 including a convex portion 24 having an inner surface 25 that protrudes axially rearward from the second side surface 22 of the clutch cover 10. In application of the non-adjusting clutch cover, the convex portion 24 of a non-adjusting clutch cover receives pressure plate (not shown) as previously discussed. As will be described, the convex portion 24 represents an essential part of the present invention.

To convert the non-adjusting clutch cover 10 to an adjusting clutch cover, the cover 10 is removed from a drive line such as that of a car and, the convex portion 24 of the cover 10 is first adapted to receive an adjusting ring 110 substantially having the embodiments of the adjusting ring known in the art. In particular, the convex portion 24 is first cleaned by taking about 0.20-0.030 of one inch depth from the inner surface 25 of the convex portion 24. Then, a threaded wall 115 is defined in the inner surface 25 such that the adjusting ring 110 having an externally threaded surface can be threadably coupled to the internally threaded surface of the inner surface 25 of the convex portion 24. The ring of material from the convex portion 24 can be removed by milling or by use of a lathe, for example.

As is known in the art, a ring adjuster is designed to mate integrally with the adjusting ring. In particular, the ring adjuster is secured to the clutch cover and passes through the clutch cover in communication with the adjusting ring. As is known in the art, the engagement of the ring adjuster with the adjusting ring allows for positional adjustment. In particular, rotating the ring adjuster rotates the adjusting ring to compensate for wear.

In the present invention, a ring adjuster is designed to mate integrally with the adjusting ring 110. In particular, the ring adjuster includes a stay bracket 300 and a worm wheel 301 opposite the stay bracket. The stay bracket 300 is secured to the first side 12 of the clutch cover 10 and the balance of the ring adjuster including the worm wheel 301 passes through the first side 12 of the clutch cover 10 so that an outer peripheral surface 303 which is a worm threaded part of the worm wheel 301 is in communication with the adjusting ring 110.

An adjuster aperture 117 (shown in FIG. 1) is opened through the cover by drilling or milling, for example, through the cover 10 and creating mill flats 119 disposed adjacent ends 117A, 117B of the adjuster aperture 117. The mill flats 119 can be created by milling or lathe, for example. Preferably, the adjuster aperture 117 is disposed on the clutch cover 10 at a location adjacent the opening 19 closest to the opposite end 17 of the wear indicator slot 14. The adjuster aperture 117 is sized so that the ring adjuster can be positioned through the clutch cover 10 as previously discussed. In application, the stay bracket is secured by screws 119A (shown in FIG. 3) to the mill flats 119 of the clutch cover 10. The balance of the stay bracket 300 including the worm wheel 301 passes through the adjuster aperture 117 so that the worm wheel 301 is in communication with the adjusting ring 110 as is known in the art. In particular, the mating with the worm threaded part, teeth 305, of the worm wheel 301 is formed on an inner peripheral surface of the adjusting ring 110 over the entire circumference thereof, so that the adjusting ring 110 is rotated for movement in the axial direction, i.e., its positional adjustment, when the worm wheel 301 rotates.

Figure 3:
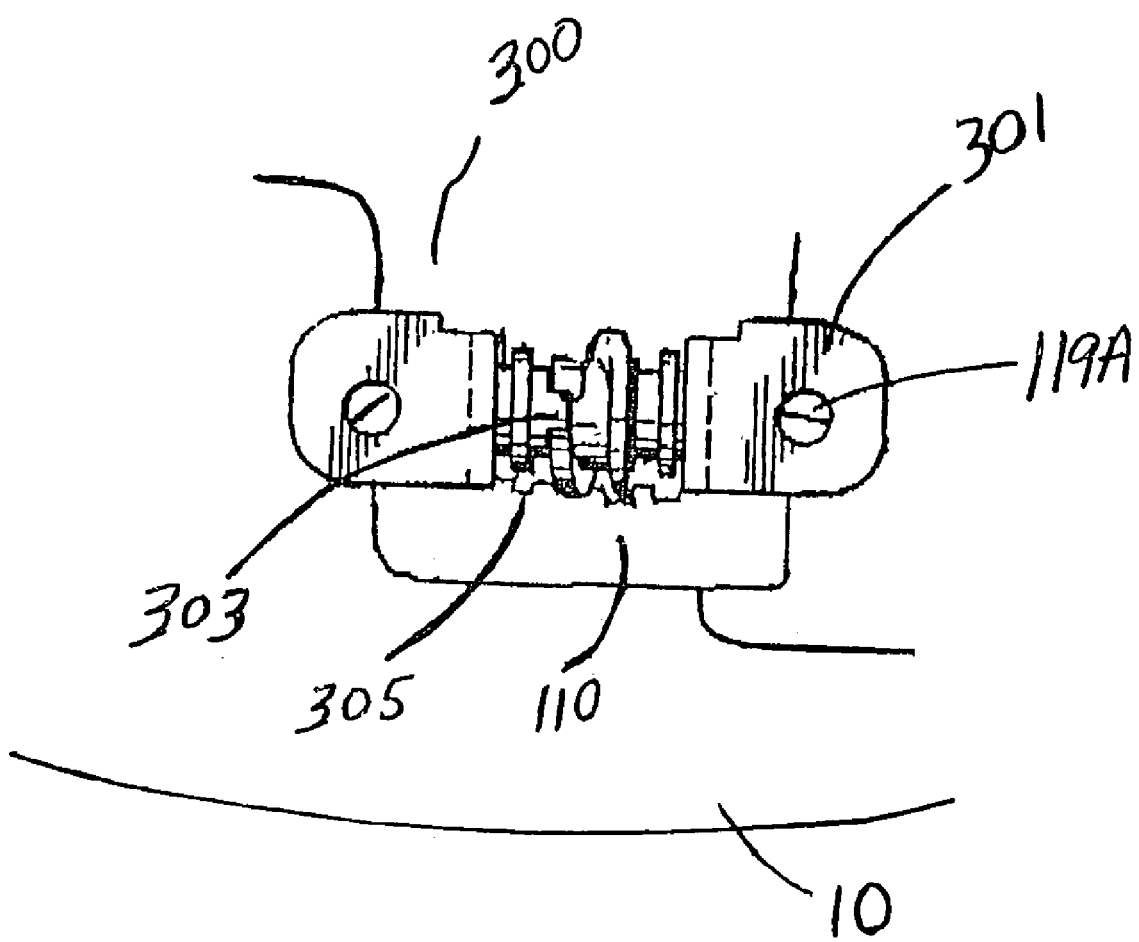
FIG. 3 shows details of the converted clutch cover.

FIG. 3 shows details of the clutch cover 10 when converted from the outside surface opposite 12. The worm wheel 301 includes threads 303 that engage teeth 305 on the adjusting ring 110. The worm wheel is bolted to the flats 119 using bolts 119A and positioned such that the worm wheel 301 will properly engage the teeth 305 once installed.

Although the description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It will be obvious to those skilled in the art that modifications may be made to the embodiments described above without departing from the scope of the invention. Thus, the scope of the invention should be determined by the claims in the formal application and their legal equivalents, rather than by the examples given.

I claim:

1. A method for converting a non-adjusting clutch cover to an adjusting clutch cover comprising the steps of:
    removing the non-adjusting clutch cover from a driveline,
    adapting a convex portion of a non-adjusting clutch cover to receive an adjusting ring comprising the steps of:
    removing material from an inner surface of the convex portion of the non-adjusting clutch, surrounding a central opening, to create an inner cylindrical surface on said convex portion,
    threading said inner cylindrical surface,
    installing an adjusting ring having an externally threaded surface in said inner cylindrical surface,
    opening an adjuster aperture through the cover,
    milling flats adjacent ends of the adjuster aperture.

2. The method as recited in claim 1, including the step of installing a ring adjuster in said adjuster aperture.

3. The method as recited in claim 1, wherein said step of opening an adjuster aperture includes the step of milling said opening.

4. The method as recited in claim 1, including the step of installing a worm ring adjuster on said flats in engagement with teeth on an inner surface of said adjuster ring.

5. A method for converting a worn non-adjusting clutch cover to an adjusting clutch cover comprising the steps of:
    removing the non-adjusting clutch cover from a driveline,
    adapting an inner surface of a non-adjusting clutch cover to receive an adjusting ring comprising the steps of:
    removing material from said inner surface of the clutch cover, surrounding a central opening, to create an inner cylindrical surface on said inner surface,
    threading said inner cylindrical surface,
    installing an adjusting ring having an externally threaded surface in said inner cylindrical surface,
    cutting an adjuster aperture through the cover,
    milling flats adjacent ends of the adjuster aperture.

6. The method as recited in claim 5, wherein said step of cutting an adjuster aperture includes the step of milling said opening.

7. The method as recited in claim 5, wherein said step of cutting an adjuster aperture includes the step of drilling said opening.

8. The method as recited in claim 6, including the step of milling flats adjacent said adjuster aperture and bolting a worm ring adjuster to said flats such that said worm ring adjuster is in engagement with teeth on an inner surface of said adjuster ring.

9. The method as recited in claim 6, wherein the step of removing material includes the step of removing a ring of material to a depth greater than 0.03 inches.

* * * * *